Patented Dec. 30, 1924.

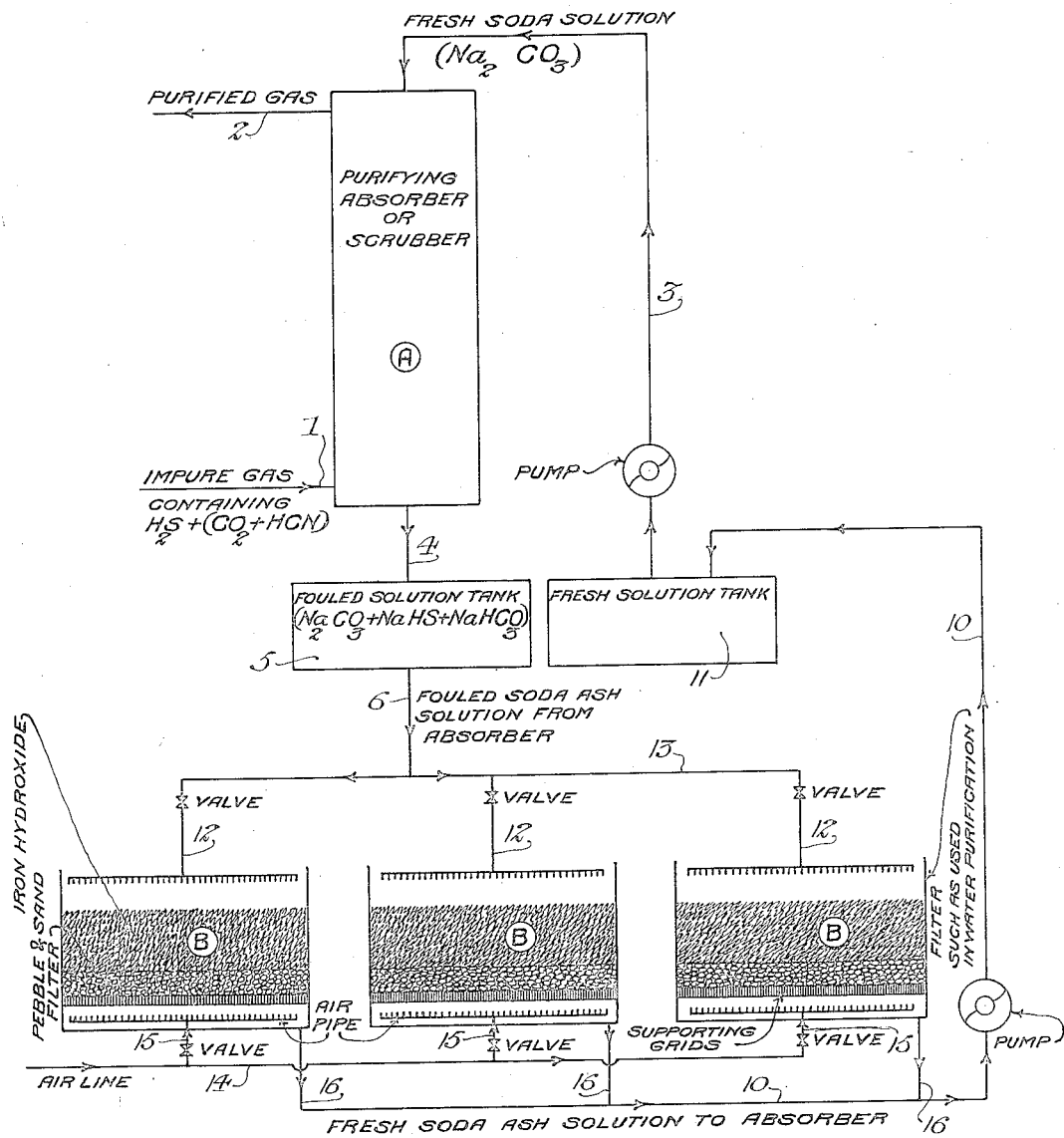

1,520,726

UNITED STATES PATENT OFFICE.

JOSEPH A. SHAW, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

PROCESS FOR PURIFYING GASES.

Application filed December 8, 1921, Serial No. 520,789. Renewed May 19, 1924.

*To all whom it may concern:*

Be it known that I, JOSEPH A. SHAW, a citizen of the United States, residing in Pittsburgh, in the county of Allegheny and State of Pennsylvania, have invented a new and useful Improvement in Processes for Purifying Gases, of which the following is a specification.

This invention relates to the removal of hydrogen sulphide and other noxious constituents, such as hydrocyanic acid, from gases containing them. Objects of the invention are to effect an efficient purification of the gases by means of an absorbent liquid which removes the noxious constituents, combined with revivification of the absorbent liquid by subsequent treatment that removes substantially all the absorbed sulphur in a solid form, whereby the escape of noxious fumes into the atmosphere in the vicinity of the gas purifying plant is avoided.

In addition to the general objects recited above, the invention has for further objects such other improvements or advantages in operation and results as are found to obtain in the processes and apparatus hereinafter described or claimed.

In the accompanying drawing forming a part of this specification and showing, for purposes of exemplification, a preferred form and manner in which the invention may be embodied and practiced, but without limiting the claimed invention specifically to such illustrative instance:

The figure illustrates a diagrammatic representation of apparatus for carrying out the improved gas purifying process of the present invention.

In its present embodiment, the invention is applied to the purification of foul gases, such as coke oven gas. For convenience, the present description will be confined to this important application of the invention. Features of the invention are, however, readily susceptible of other valuable applications; consequently, the invention is not confined in its scope to the specific use and embodiment herein described as an illustrative example.

In carrying out the invention, the gases, after the tar and ammonia have been removed, are brought into contact with an absorbent agent constituted of a purifying solution which is alkaline in reaction, for example: a sodium carbonate solution. The concentration of the solution may be varied as desired; in practice, a one to five per cent solution of sodium carbonate will be found satisfactory. The gases to be purified enter the bottom of the scrubber or washer A, through a gas line 1 and discharge from the top of said scrubber through the purified-gas line 2. The purifying solution is delivered to the top of the scrubber A through the solution line 3 and the solution containing the absorbed impurities discharges from the bottom of said scrubber through a line 4 into a fouled solution tank or sump 5. In the scrubber, the solution absorbs the hydrogen sulphide and other noxious constituents of the gases, forming soluble sulphide compounds, such as sodium hydrogen sulphide. Carbon dioxide, if present in the gas, is also absorbed.

In accordance with the invention, the resulting fouled solution from the absorber A, is regenerated by effecting contact of such fouled solution with a bed of an iron compound having an affinity for sulphur. A suitable iron compound for this purpose is iron oxide. The apparatus for such regenerative treatment of the fouled solution is illustrated in the accompanying drawing and consists of a sand filter B, of any of the ordinary types, such as are employed in water purification. A filter of this type is constituted essentially of a tank with supporting grids near the bottom. On the grids, a layer of coarse pebbles is laid, and on these, finer pebbles, then fine sand. Above or below the grids a number of perforated air pipes are provided. For the present purposes, a bed of iron oxide may be employed in place of the fine sand, or may be mixed with the sand. The fouled alkaline solution from the tank 5 is discharged onto the bed of iron oxide by means of a spray, for example, and filters through the iron oxide coming into intimate contact with it. As a result of such filtration, the iron oxide is converted into iron sulphide, and concurrently the alkaline solution is regenerated. The regenerated alkaline solution is discharged from the bottom of the filter and may be pumped through an aerating vessel if necessary, before being delivered to the storage tank 11. The fresh solution is then ready to purify more gas in the absorber or scrubber A.

In practice, it is preferable to employ a number of filters B. Three of such filters are shown in the drawing. The spray pipes of the respective filters are supplied from branch pipes 12 provided with individual controlling-valves and leading from a manifold 13 that is connected with the fouled solution discharge line 6. An air manifold 14 is connected with branch pipes 15 having similar controlling-valves. The regenerated solution from the several filters discharges through branch line 16 into the return solution line 10. In the operation of the system, when the bed of iron oxide in any one tank is well sulphided, the fouled liquor inlet is shut off, and the air is turned on at the bottom. This aeration converts the iron sulphide to iron oxide and to free sulphur, so that the bed is ready to treat further quantities of fouled liquor.

The chemical reactions taking place in the absorption stage may be exemplified by the following equations:

(a) Absorption of hydrogen sulphide by sodium carbonate:

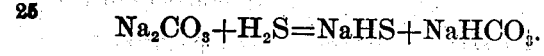
$$Na_2CO_3 + H_2S = NaHS + NaHCO_3.$$

(b) Carbon dioxide, if present, is also absorbed:

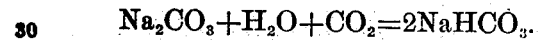
$$Na_2CO_3 + H_2O + CO_2 = 2NaHCO_3.$$

(c) Hydrocyanic acid, if present, is also absorbed:

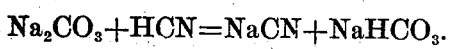
$$Na_2CO_3 + HCN = NaCN + NaHCO_3.$$

The chemical reaction in the filters may be exemplified by the following equation:

Conversion of iron oxide to iron sulphide and regeneration of the alkali:

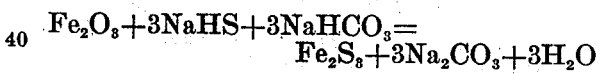
$$Fe_2O_3 + 3NaHS + 3NaHCO_3 = Fe_2S_3 + 3Na_2CO_3 + 3H_2O$$

The chemical reaction during aeration of the iron sulphide in the filters is substantially as follows:

Oxidation of iron sulphide to iron oxide and free sulphur:

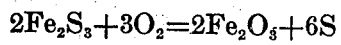
$$2Fe_2S_3 + 3O_2 = 2Fe_2O_3 + 6S$$

By aerating the clear alkaline liquor, sodium bicarbonate is converted to carbonate, according to the following equation:

$$2NaHCO_3 = Na_2CO_3 + CO_2 + H_2O.$$

The invention as hereinabove set forth may be variously embodied within the scope of the claims hereinafter made.

What is claimed is:

1. The process of purifying gases which consists in: passing the gas into contact with an absorbent solution constituted of dissolved alkali to absorb sulphur from the gas; then bringing the solution containing the absorbed impurities into contact with a bed of an iron compound, whereby a reaction occurs in which sulphur is transferred from the alkali to the iron, with formation of iron sulphide; then discharging the rejuvenated alkali solution for employment for further gas purification; and subjecting the iron sulphide in the bed to aeration to remove the sulphur and to restore the iron to a state for effecting further absorption of sulphur; substantially as specified.

2. The process of purifying gases which consists in: passing the gas into contact with an absorbent solution constituted of dissolved alkaline sodium compound to absorb sulphur from the gas; then bringing the solution containing the absorbed impurities into contact with a bed of an iron compound, whereby a reaction occurs in which sulphur is transferred from the sodium compound to the iron, with formation of iron sulphide; then discharging the rejuvenated sodium compound solution for employment for further gas purification; and subjecting the iron sulphide in the bed to aeration to remove the sulphur and to restore the iron to a state for effecting further absorption of sulphur; substantially as specified.

3. The process of purifying gases which consists in: passing the gas into contact with an absorbent solution constituted of dissolved sodium carbonate to absorb sulphur from the gas; then bringing the solution containing the absorbed impurities into contact with a bed of an iron compound, whereby a reaction occurs in which sulphur is transferred from the sodium carbonate to the iron, with formation of iron sulphide; then discharging the rejuvenated sodium carbonate solution for employment for further gas purification; and subjecting the iron sulphide in the bed to aeration to remove the sulphur and to restore the iron to a state for effecting further absorption of sulphur; substantially as specified.

4. The process of purifying gases which consists in: passing the gas into contact with an absorbent solution constituted of dissolved alkali to absorb sulphur from the gas; then bringing the solution containing the absorbed impurities into contact with a bed of iron oxide, whereby a reaction occurs in which sulphur is transferred from the alkali to the iron, with formation of iron sulphide; then discharging the rejuvenated alkali solution for employment for further gas purification; and subjecting the iron sulphide in the bed to aeration to remove the sulphur and to restore the iron to a state for effecting further absorption of sulphur; substantially as specified.

JOSEPH A. SHAW.